United States Patent
Muller et al.

(10) Patent No.: US 9,656,466 B1
(45) Date of Patent: May 23, 2017

(54) INTRODUCING GRAIN PATTERNS INTO IMAGES

(71) Applicant: HEWLETT-PACKARD DEVELOPMENT COMPANY, L.P., Houston, TX (US)

(72) Inventors: Andreas Muller, Barcelona (ES); Utpal Kumar Sarkar, Sant Quirze del Valles (ES)

(73) Assignee: HEWLETT-PACKARD DEVELOPMENT COMPANY, L.P., Houston, TX (US)

( * ) Notice: Subject to any disclaimer, the term of this patent is extended or adjusted under 35 U.S.C. 154(b) by 0 days.

(21) Appl. No.: 15/223,157

(22) Filed: Jul. 29, 2016

(51) Int. Cl.
| | | |
|---|---|---|
| *B41J 2/21* | (2006.01) | |
| *G06K 15/10* | (2006.01) | |
| *B41J 2/045* | (2006.01) | |

(52) U.S. Cl.
CPC ....... *B41J 2/04573* (2013.01); *B41J 2/04586* (2013.01); *B41J 2/2132* (2013.01); *G06K 15/107* (2013.01)

(58) Field of Classification Search
CPC ...... B41J 2/04573; B41J 2/04586; B41J 2/21; B41J 2/2132; G06K 15/02; G06K 15/105; G06K 15/102
See application file for complete search history.

(56) References Cited

U.S. PATENT DOCUMENTS

| | | | | |
|---|---|---|---|---|
| 5,777,640 A | * | 7/1998 | Shioya | B41J 2/2054 347/15 |
| 6,050,675 A | * | 4/2000 | Bartolome | B41J 2/2139 347/41 |
| 6,536,869 B1 | * | 3/2003 | Bland | B41J 2/2132 347/12 |
| 6,547,354 B1 | * | 4/2003 | Askeland | B41J 2/2132 347/12 |
| 6,865,325 B2 | * | 3/2005 | Ide | G02B 6/0043 345/30 |
| 7,118,188 B2 | * | 10/2006 | Vilanova | B41J 2/01 347/19 |

* cited by examiner

*Primary Examiner* — Anh T. N. Vo
(74) *Attorney, Agent, or Firm* — Trop, Pruner & Hu

(57) ABSTRACT

In some examples, a printing system includes a printhead comprising a nozzle array including plural columns of nozzles to deliver printing fluid to a print medium, wherein nozzles in a first column of the columns are offset from nozzles in a second column of the columns. A controller is to cause introduction of a grain pattern into an image printed using the printhead onto the print medium by, for each respective pass of a plurality of passes of the printhead over the print medium, controlling an advance of the print medium by an uneven advance step for a print mask pattern that controls firing of the nozzles of the printhead, where the advance of the print medium by the uneven advance step causes an irregular pattern of firing of the nozzles of the printhead in successive passes of the plurality of passes.

15 Claims, 8 Drawing Sheets

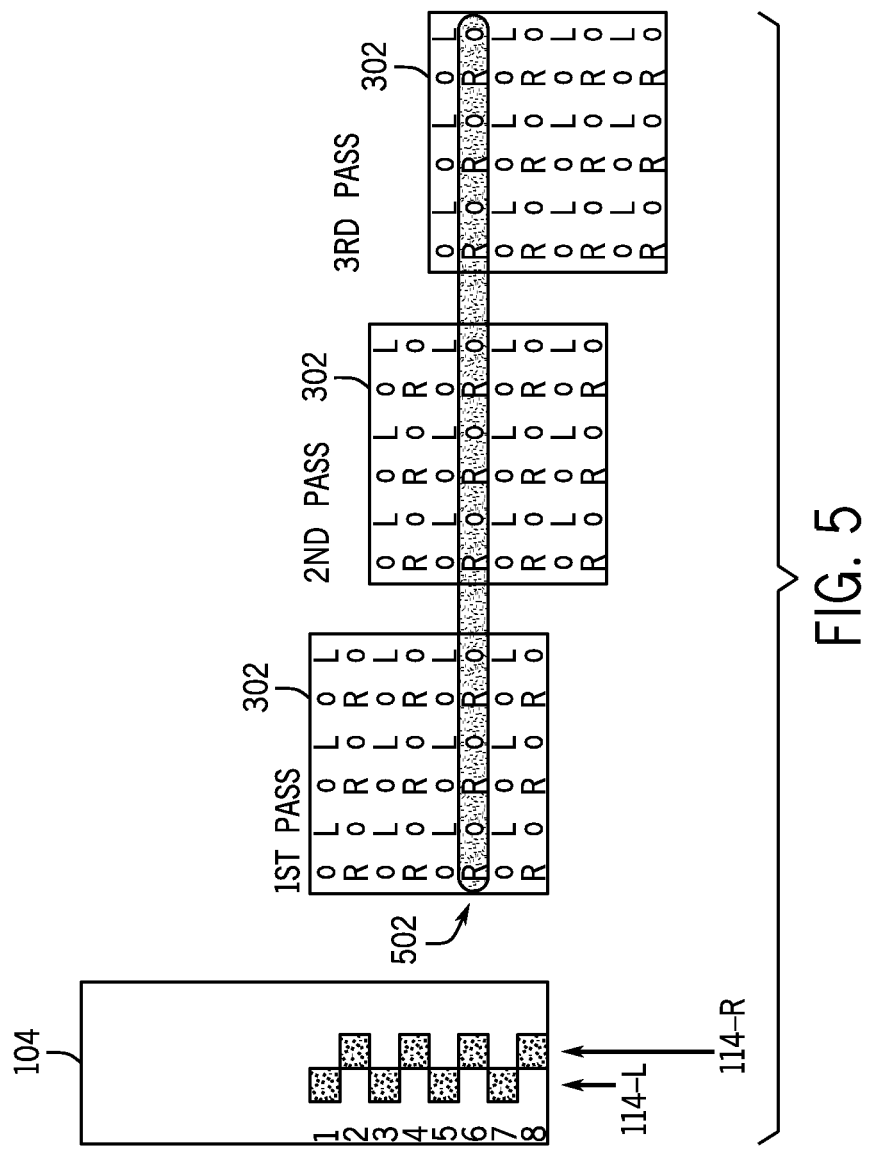

INTRODUCING GRAIN PATTERNS INTO IMAGES

BACKGROUND

Certain printing systems, such as inkjet printers, print dots on a print medium by ejecting small drops of ink from nozzles. A number of nozzles can be carried on a moveable printhead that can be scanned across a surface of the print medium. Each nozzle may be controlled individually to eject a drop of printing fluid, such as ink when commanded. By appropriate control of each nozzle as the printhead carrying the nozzles is scanned across the surface of the print medium, a desired pattern of printing fluid drops can be deposited on the print medium

BRIEF DESCRIPTION OF THE DRAWINGS

Some implementations of the present disclosure are described with respect to the following figures.

FIG. 5 is a schematic diagram showing an example where a print medium is advanced by an even advance step between passes of multiple passes when printing to a print medium, according to some examples.

DETAILED DESCRIPTION

Figure 1A:
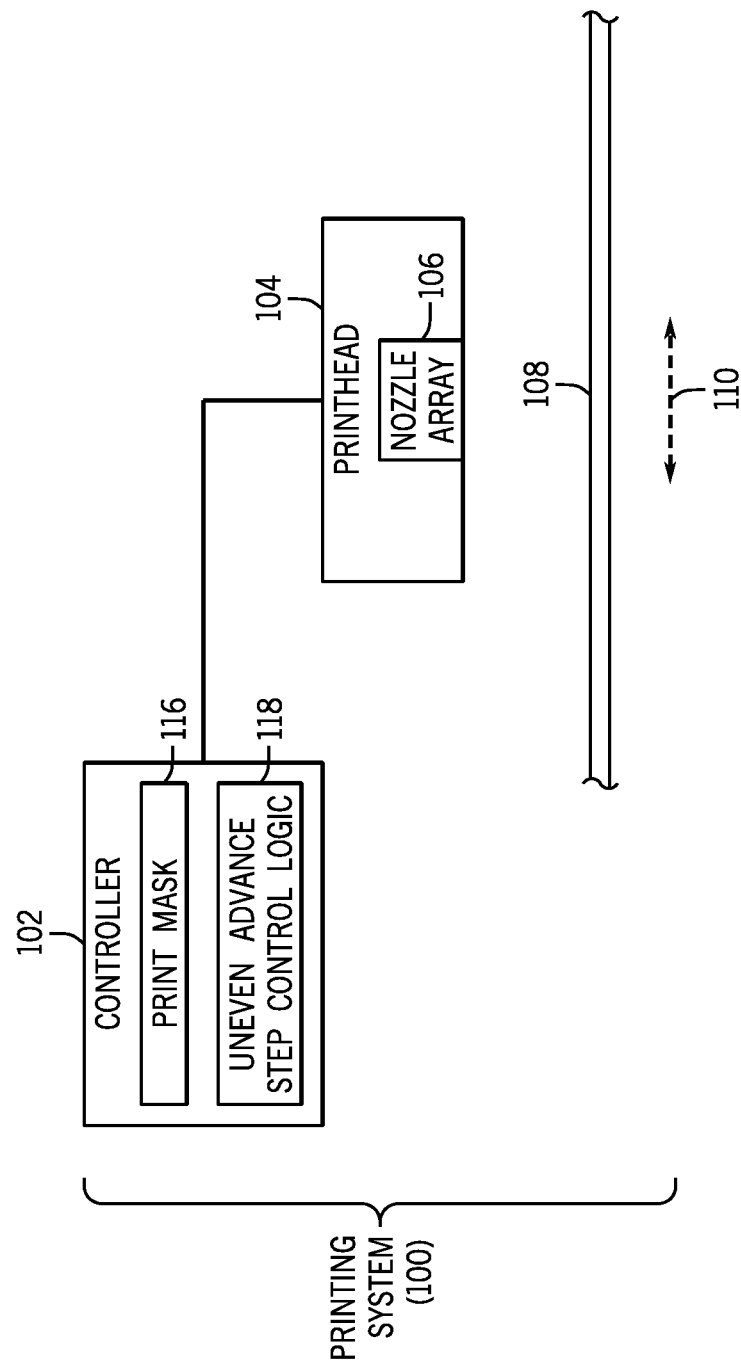
FIGS. 1A and 1B are block diagrams of portions of a printing system according to some examples.

A printing system includes a printhead (or multiple printheads) having nozzles that can deliver printing fluids to a print medium to print an image. An image that is printed can include text and/or graphics. In printing systems that employ a printhead that scans across a print medium, banding can occur in the form of visible horizontal lines or zones or bands with noticeable different saturation or hue that run in the direction of the printhead or along a scan axis (which is a direction of scanning of the printhead). Banding can be caused by misalignment of printhead nozzles, clogs in nozzles, interactions of ink droplets on a print medium, dot placement, and/or other factors. In other examples, other artifacts in an image that is printed onto a print medium can occur due to the foregoing factors. Generally, banding or other artifacts can deteriorate the quality of the image that is printed on the print medium.

In accordance with some implementations of the present disclosure, techniques or mechanisms can be employed to introduce, by using print masks, a grain pattern into an image that is printed on a print medium by a printing system. Introducing a grain pattern into an image can refer to introducing noise into the image that makes parts of the image of a quality that is less ideal than the original image that was intended to be printed on the print medium. The noise can be in the form of defects in pixels that are printed on the print medium, where defects in pixels can refer to pixels that do not accurately represent the color, position, or other characteristic of the original image accurately. For certain print applications, the amount of graininess introduced into the printed image does not noticeably deteriorate the quality of the printed image, from the perspective of the user. For example, for printed images on signs or posters that are viewed from some distance, a certain level of graininess may be acceptable as a tradeoff for a reduction of other visual artifacts.

Generally, in some examples, print masks are designed to reduce the visible amount of grain as much as possible. However, in accordance with some implementations of the present disclosure, print masks are designed to actually introduce graininess into a printed image. The ability to introduce a grain pattern into an image that is to be printed allows the printing system to be more robust with respect to various visual defects, such as banding or other visual artifacts in image content. Superimposing a grain pattern into a printed image to mask other visual artifacts is a type of visual masking or pattern masking. The robustness against visual artifacts achieved by introducing a grain pattern according to some implementations can be performed without adversely affecting the text and line quality of the printing system, where the text and line quality of the printing system can refer to the quality (e.g., sharpness, etc.) of text and/or lines printed by the printing system.

In the ensuing discussion, reference is made to printing systems in which halftone techniques are used to print color images onto print media. As used here, a print medium can refer to a two-dimensional print medium, or alternatively, or three-dimensional print target such as a build material or other three-dimensional print target. With a halftone technique, each pixel of a color image can be formed from a number of dots of ink of the available colors in the printing system. A halftone technique forms a halftone image by breaking up a continuous tone image into a pattern of dots of varying sizes, shapes, and/or distribution so that the continuous tone image can be printed using the available colors of the printing system. Halftone printing is a printing technique that simulates continuous tone using dots varying in size, shape and/or distribution.

Although reference is made to halftone printing in some examples, it is noted that in other examples, other printing systems can employ other techniques for printing images onto print media.

To control the placement of ink drops for pixels of an image being printed, print masks are used that define a location at which a dot of a particular color can be deposited in a halftone pattern associated with a specified pixel of the image to be printed during a single pass of the printhead. A pass of a printhead can refer to a print phase where the printhead is scanned by a specified distance.

Based upon the desired appearance of each pixel, the drops of printing fluid to be deposited in each position of the halftone pattern for the pixel are determined. For a light color pixel it may be sufficient to deposit a single drop of ink in the halftone pattern associated with that pixel. For a darker color pixel, further dots can be deposited on the same pixel. Dots are deposited at the determined positions based on use of respective print masks in the corresponding passes of the printhead, where each respective print mask is used for a corresponding pass. There is just one firing opportunity per halftone cell per pass, where a firing opportunity refers to an opportunity to deliver printing fluid through a nozzle, and a halftone cell refers to a position of the halftone pattern.

Figure 1B:
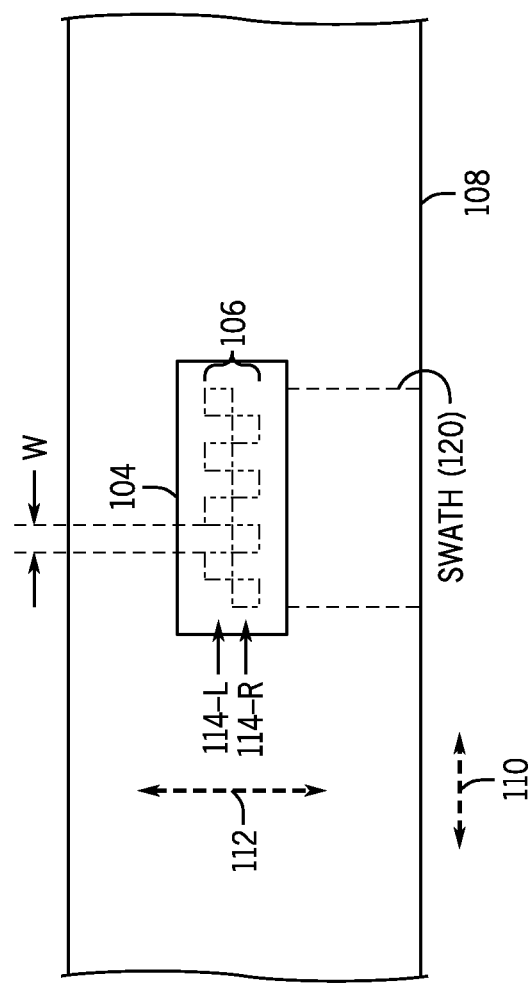

FIGS. 1A-1B illustrate a portion of an example printing system 100. The printing system 100 includes a controller 102 and a printhead 104. The controller 102 can be implemented as a hardware processing circuit or as a combination of machine-readable instructions executable on a hardware processing circuit. As examples, the hardware processing circuit can include a microprocessor, a core of a multi-core microprocessor, a digital signal processor, a microcontroller, a programmable gate array, a programmable integrated circuit device, or other type of circuit to perform processing. Although shown as one unit, it is noted that the controller 102 can be implemented as a single device or as multiple devices.

The printhead 104 includes a nozzle array 106 that includes nozzles for depositing a printing fluid onto a print medium 108. The print medium 108 can include a paper substrate, a transparency foil, or any other substrate onto which an image can be printed. The print medium 108 is moveable by a print medium transport mechanism (e.g., an assembly of rollers) in a direction along an axis 110 during a print operation in the printing system 100. The axis 110 can be referred to as an advance axis, as the print medium 108 can be advanced along a direction along the advance axis 110. Also, as shown in FIG. 1B, the printhead 104 can be scanned in a second, different direction along a scan axis 112, which in the example of FIG. 1B is across the lateral width of the print medium 108. The printhead 104 can be mounted on a carriage that can be scanned along the scan axis 112. The printhead 104 can be scanned along the scan axis 112 during a pass of the printhead 104. Multiple passes of the printhead can involve multiple scans of the printhead 104 across the surface of the print medium 108 along the scan axis 112. The scan axis 112 can be generally perpendicular to the advance axis 110.

In the present disclosure, scanning a printhead across a print medium can refer to either the printhead being moved or the print medium being moved, or both the printhead and print medium being moved, such that relative motion is provided between the printhead and the print medium along the scan axis 112. Similarly, advancing a print medium can refer to moving the print medium, or moving the printhead, or moving both the print medium and the printhead, such that relative motion is provided between the printhead and the print medium along the advance axis 110.

As shown in FIG. 1B, the nozzle array 106 (for a respective colorant) includes multiple columns of nozzles, where each nozzle is represented by a rectangle. There may be multiple nozzle arrays for multiple colorants. In the example of FIG. 1B, the multiple columns of nozzles include a first column 114-L of nozzles and a second column 114-R of nozzles. Although just two columns of nozzles are shown as part of the nozzle array 106, it is noted that in other examples, the nozzle array 106 can include more than two columns of nozzles.

As shown in FIG. 1B, the nozzles in the first column of nozzles 114-L are offset or staggered from the nozzles of the second column 114-R. Thus, rather than a nozzle in the first column 114-L being positioned right next to a corresponding nozzle in the second column 114-R, the nozzle in the first column 114-L is shifted by a certain distance from the corresponding nozzle in the second column 114-R along the length of the printhead 104, where this length of the printhead extends along a direction that is parallel to the advance axis 110. In some examples, the shifted distance of a nozzle in the first column 114-L with respect to the closest nozzle in the second column 114-R is generally equal to a width of a nozzle (referred to as "nozzle width"), indicated as W in FIG. 1B. In other examples, a nozzle in the first column 114-L can be offset from the closest nozzle in the second column 114-R by a different distance. In some examples, the use of offset nozzles of the first and second columns 114-L and 114-R results in nozzles of one column being next to gaps in the other column.

In the ensuing discussion, the column 114-L can be referred to as a left column, while the column 114-R can be referred to as a right column. It is noted, however, that techniques or mechanisms according to some implementations can be implemented with printheads having nozzle arrays with more than two columns of nozzles.

In a given pass of the printing system 100, scanning the printhead 104 along the scan axis 112 causes the nozzles that extend across the length of the printhead 104 to print a respective swath 120 on the print medium 108. The swath 120 extends generally along the scan axis 112. Each nozzle on the printhead 104 prints a respective row of the swath 120 as the printhead 104 is scanned along the scan axis 112.

Although reference is made to columns of nozzles on the printhead 104, and rows of the swath 120, it is noted that the use of the terms "columns" and "rows" is for convenience of discussion, and is not intended to imply any specific orientation of the nozzles and printed portions of the swath 120. For example, reference can be made to rows of nozzles on the printhead 104 and printed columns of the swath 120.

FIG. 1A further shows that the controller 102 stores or has access to a print mask 116 and includes an uneven advance step control logic 118. Although just one print mask 116 is shown, it is noted that the controller 102 can store or has access to multiple print masks, such as different print masks for different passes. The print mask 116 includes indicators that control which nozzles are fired in a given pass of the printhead 104. Such indicators can be in the form of bits, for example, where if the bit has a first value, a corresponding nozzle is fired, but if the bit has a second value, the corresponding nozzle is maintained in an inactive state (i.e., not fired). The print mask 116 can be in the form of an array of the indicators that can be set to respective first or second values to control firing of respective nozzles.

The uneven advance step control logic 118 is part of the controller 102, and can be implemented as a hardware processing circuit or a combination of machine-readable instructions executable on the hardware processing circuit. The uneven advance step control logic 118 is able to control an advance of the print medium 108 by an uneven advance step between successive passes of multiple passes of the printhead 104. An "advance step" refers to an advance of the print medium 108 by a specified distance. As noted above, to print onto the print medium 108, the printhead 104 can be scanned in multiple passes across the print medium 108. Between successive passes, the print medium 108 can be advanced by a specific advance step.

Advancing the print medium 108 by an uneven advance step between successive passes can allow for introduction of a grain pattern into an image printed on the print medium 108. The advance of the print medium 108 by the uneven advance step causes an irregular pattern of firing of the nozzles one the printhead 104 in successive passes of the printhead 104, such that the grain pattern is introduced in the printed image.

More specifically, in some examples, an uneven advance step of a print medium refers to an advance step that results in nozzles from different columns of nozzles of the printhead 104 being used (based on respective print masks) to deliver dots to a given row of the swath 120 in successive passes of the multiple passes. As discussed further below, an even advance step of a print medium refers to an advance step that results in nozzles from same column of nozzles of the printhead 104 being used (based on respective print masks) to deliver dots to a given row of the swath 120 in successive passes of the multiple passes.

As an example of using an uneven advance step, in a first pass, printing according to a first print mask results in just nozzles of the left column 114-L being used to deliver dots to the given row. In a second pass that is the immediate next pass following the first pass, the print medium is advanced by a specified distance such that printing according to a second print mask results in just nozzles of the right column 114-R being used to deliver dots to the given row. If there are more than two passes, then in a third pass that is the immediate next pass following the second pass, the print medium is advanced by a specified distance such that printing according to a third print mask results in just nozzles of the left column 114-L being used to deliver dots to the given row.

The columns 114-L and 114-R of nozzles of the nozzle array 106 can be part of a trench or bar of the printhead 104. There can be multiple trenches or bars on the printhead 104, where each trench or bar can include respective columns of nozzles that are offset with respect to each other (similar to the arrangement shown in FIG. 1B). For example, a first trench or bar can be used for printing black ink, while another trench or bar can be used for printing an ink of another color. More generally, a trench or bar can refer generally to a defined portion of a printhead that includes an array of nozzles. Techniques or mechanisms according to some implementations can be applied to printheads that include just one trench or bar, or multiple trenches or bars.

In some implementations, the halftone resolution (resolution of a halftone image used to deliver dots to print pixels of an image) is less than the print resolution of the printing system 100. For example, the print resolution of the printing system 100 can be 600×1200 dots per inch (dpi), while the halftone resolution can be 600×600 dpi. Although specific halftone and print resolutions are noted above, in other examples, other halftone or print resolutions can be employed.

Figure 2:
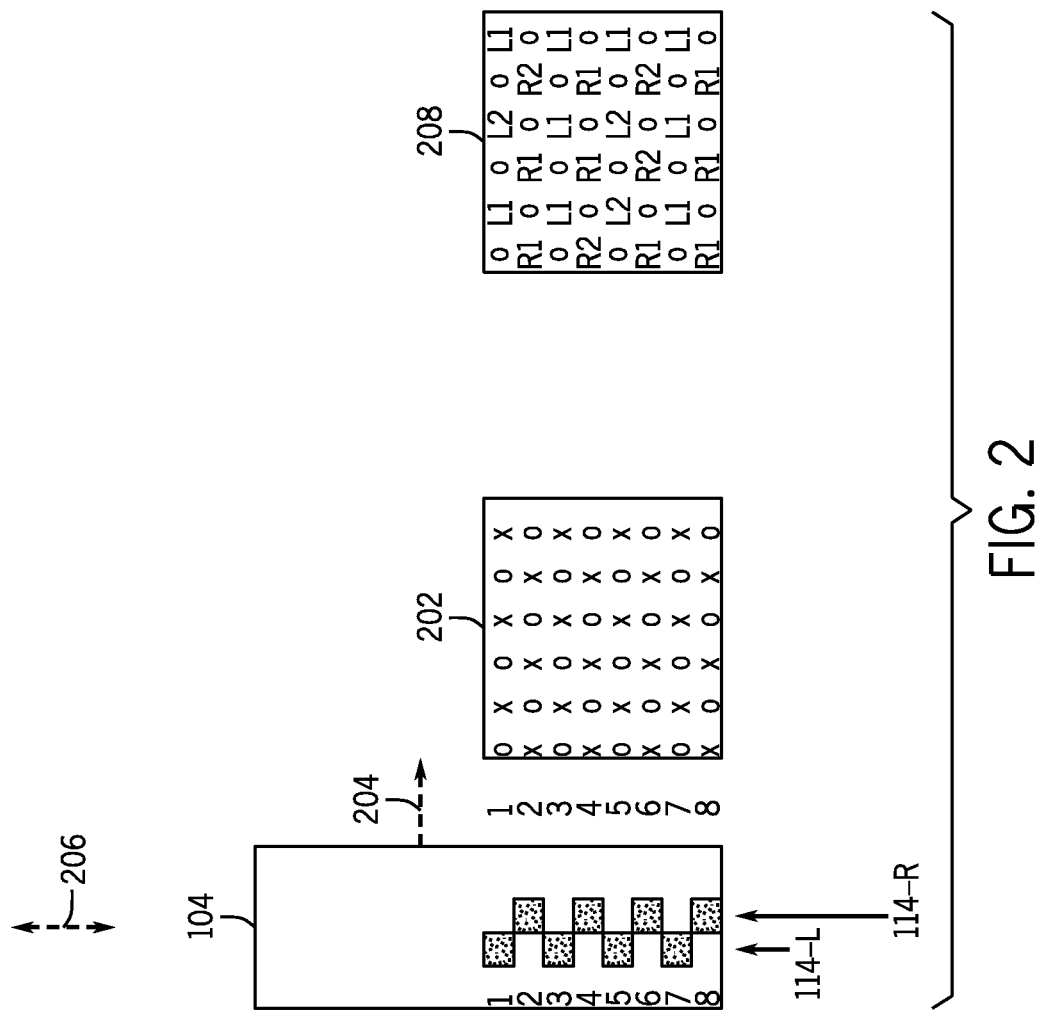
FIG. 2 is a schematic diagram showing a portion of a printhead that has multiple columns of nozzles, and a print mask pattern according to some examples.

To match the difference between the halftone resolution and the print resolution, a print mask pattern 202 (also referred to as a "hole pattern") as shown in FIG. 2 can be employed, where "O" indicates a respective position where no firing of a nozzle is to occur, while "X" indicates a nozzle firing opportunity at the respective position. Each position indicated by an "O" can also be referred to as a "hole." A nozzle firing opportunity for a given position of the print mask pattern 202 indicates that the corresponding nozzle at the given position can be fired. However, whether or not the nozzle at the given position is actually fired depends on the specific print mask (which has a pattern based on the print mask pattern or hole pattern 202) that is used. In some examples, it is assumed that there are two halftone levels (0 or 1, where 0 indicates off and 1 indicates on) so that just one hole pattern 202 is used. However, in other examples, there can be more than two halftone levels, in which case multiple hole patterns can be used, where the multiple hole patterns can be different from one another.

The introduction of a grain pattern using techniques according to some implementations of the present disclosure occurs based on the combination of using an even pattern of holes (such as with the pattern shown in FIG. 2 where there are holes distributed across the pattern 202 in each row and column) and use of an uneven advance step.

A print mask 208 that is generated according to the print mask pattern 202 includes an array of settable indicators (L indicators and R indicators) that map to the "X" positions in the print mask pattern 202. At each position of the print mask corresponding to an "O" location, the print mask 208 would have an off indicator to prevent firing of a nozzle at that position. However, at each position of the print mask 208 corresponding to an "X" position of the print mask pattern 202, the print mask 208 can have a dynamically settable indicator that can be set to a first value to cause firing of the respective nozzle, or a second value to prevent firing of the nozzle. In examples according to FIG. 2, the L indicators control firing of nozzles in the left column 114-L, while the R indicators control firing of nozzles in the right column 114-R. For a given pass, L1 indicates that the left nozzle at the corresponding position is to be fired, while, for a given pass, L2 indicates that the left nozzle at the corresponding position is be maintained inactive. Similarly, for a given pass, R1 indicates that the right nozzle at the corresponding position is to be fired, while, for a given pass, R2 indicates that the right nozzle at the corresponding position is be maintained inactive.

Generally, in some examples, the print mask pattern 202 is a checkerboard pattern of "O" and "X" positions. In other examples, the print mask pattern 202 can have other patterns of "O" and "X" positions, so long as such other print mask patterns include arrangements of "O" and "X" positions against which an uneven advance step can be defined so that nozzles of different columns print to a given row in successive passes. The checkerboard pattern represents the pattern is the aggregate of all passes for a respective halftone level or the pattern used in a one pass mode.

In the example of FIG. 2, the two columns 114-L and 114-R of nozzles effectively provide eight nozzles that extend generally along the length of the printhead 104 along axis 206. Although a specific number of nozzles are shown in the example of FIG. 2, it is noted that in other examples, a different number of nozzles can be provided in the multiple columns of nozzles of the printhead 104. The eight nozzles can print eight corresponding rows across the swath 120 (FIG. 1B). The swath 120 has a depth that depends on the number of nozzles of the printhead that can be concurrently fired as the printhead 104 is scanned in the scan direction 204 with respect to a print mask (e.g., 208) that is according to the print mask pattern 202.

More generally, a printhead trench or bar can include N columns (N>1). In this general case, an uneven advance step can be an advance step by a number (A) of rows that is relatively prime to N, in other words, so that the greatest common divisor of N and A is 1. In this way, each row of a swath is passed over by nozzles of different columns in successive passes.

Figure 3:
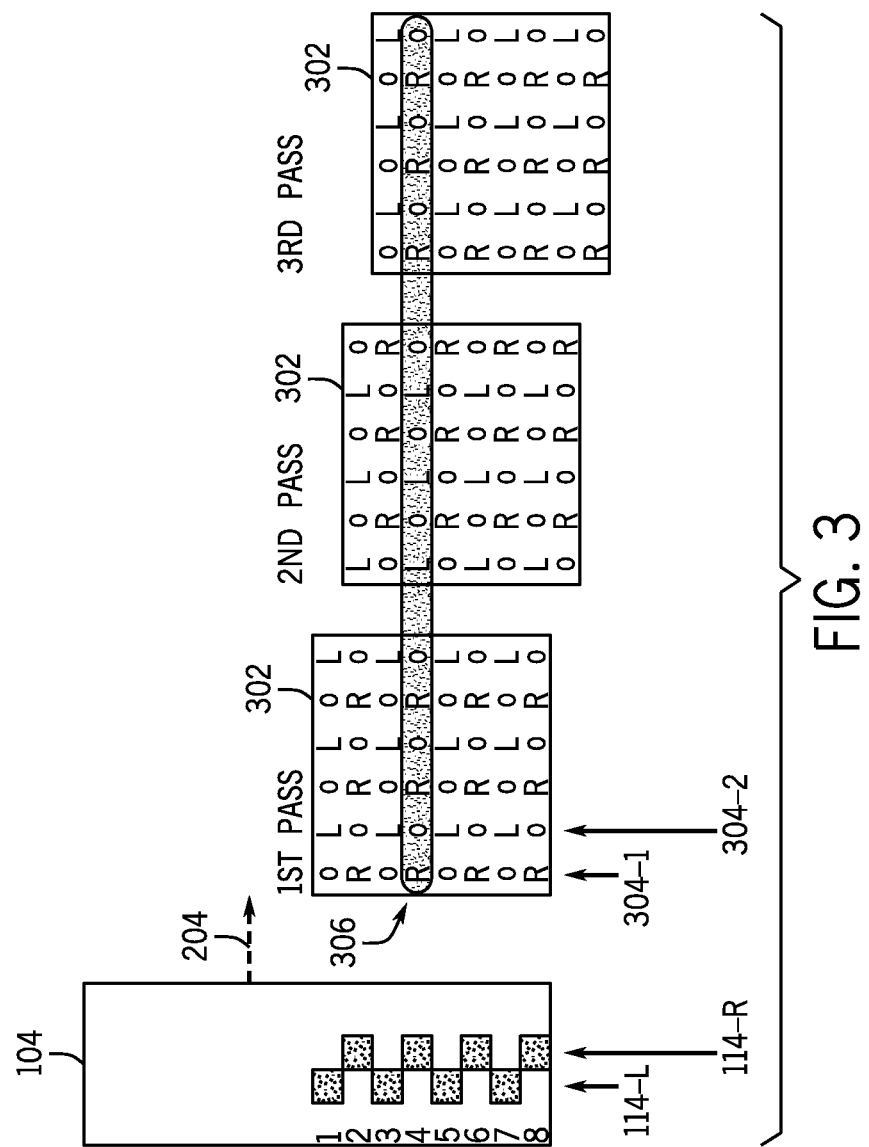
FIG. 3 is a schematic diagram showing an example where a print medium is advanced by an uneven advance step between passes of multiple passes when printing to a print medium, according to some examples.

FIG. 3 shows a more specific print mask pattern 302, which has the general pattern of the print mask pattern 202, except that each "X" position is replaced with either an "L" position or an "R" position in the print mask pattern 302. An "L" position indicates a nozzle firing opportunity for a left nozzle in the left column 114-L, while an "R" position indicates a nozzle firing opportunity for a right nozzle in the right column 114-R. The print mask pattern 302 has multiple rows, where successive rows of the multiple rows specify firing opportunities for nozzles in respective different columns of nozzles.

As the printhead 104 is scanned in the direction 204 with respect to the print mask pattern 302, the first column 304-1 of the print mask pattern 302 specifies nozzle firing opportunities for the right nozzles in the right column 114-R; in other words, the first column 304-1 of the print mask pattern 302 specifies that just the right nozzles can be fired to print to a respective column on the print medium 108. When the nozzle 104 is scanned to the second column 304-2 of the print mask pattern 302, nozzle firing opportunities are defined for just the left nozzles of the left column 114-L, such that just the left nozzles can be used to print to a respective column on the print medium 108 that corresponds to the second column 304-2 of the print mask pattern 302. The foregoing is repeated for additional columns of the print mask pattern 302 as the printhead 104 is scanned with respect to the print mask pattern 302.

Scanning a printhead 104 with respect to a print mask pattern can refer to using different columns of the print mask pattern 302 to control firing of respective nozzles of the printhead 104 for different positions of the printhead 104 in the scan direction 204.

FIG. 3 also shows different relative positions of the print mask pattern 302 to the print medium 108 due to advances of the print medium 108 in respective first, second, and third passes. Each pass refers to a respective scan of the printhead 104 across the print medium 108. After the first pass is completed, and before the second pass is performed, the print medium 108 is advanced by an uneven advance step, which in the example of FIG. 3 corresponds to an advance step of one row of the print mask pattern 302. In other examples, the uneven advance step can be of a different value, such as an advance step of three rows, an advance step of five rows, and so forth.

Whether or not an advance step of a print medium is an uneven advance step depends on the print mask pattern 302. In the example of FIG. 3, since the print mask pattern 302 specifies nozzle firing opportunities for just left nozzles in the first row, just right nozzles in the second row, just left nozzles in the third row, and so forth, an uneven advance step is an odd advance step, which is an advance step that advances the print medium by an odd number of rows (e.g., 1 row, 3 rows, 5 rows, etc.).

If the print mask pattern 302 has a different pattern nozzle firing opportunities for left and right nozzles, then an uneven advance step can be differently defined.

More generally, as noted above, an uneven advance step of a print medium refers to an advance step that results in nozzles from different columns of nozzles of the printhead 104 being used (based on respective print masks) to deliver dots to a given row of the swath 120 in successive passes of the multiple passes.

For example, for a given row 306 as shown in FIG. 3, in the first pass, the print mask pattern 302 specifies nozzle firing opportunities using just the right nozzles and not the left nozzles to print to the given row 306. However, in the second pass that immediately follows the first pass, the uneven advance step of the print medium causes the print mask pattern 302 to define nozzle firing opportunities for just the left nozzles, and not the right nozzles, to print to the given row 306. Then, in the third pass immediately following the second pass, the print mask pattern 302 specifies nozzle firing opportunities for just the right nozzles, and not the left nozzles, to print to the given row 306.

The uneven advance step of the print medium in successive passes results in respective use of different columns of nozzles, which produces an irregular pattern of firing of the nozzles of the printhead 104. This irregular pattern of firing of the nozzles of the printhead 104 can produce graininess due to slight misalignments between the left and right nozzles resulting from manufacturing tolerances. Moreover, with the irregular pattern of firing of the nozzles, in some cases, dots can be printed right next to each other, while in other cases, dots are printed with a larger space between them. Ink drops that are placed right next to each other can dry differently than ink drops that are placed further apart. The foregoing combination of factors can introduce noise into the image that is printed onto the print medium, where this noise produces the grain pattern.

Figure 4C:
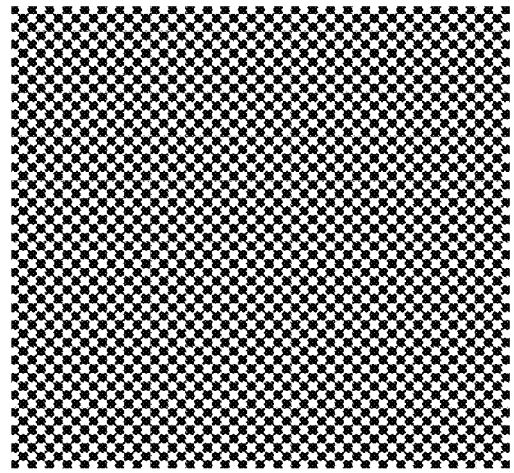
FIGS. 4A-4C illustrate an irregular pattern of firing of nozzles of a printhead using the uneven advance step of a print medium between passes, according to some examples.
Figure 4B:
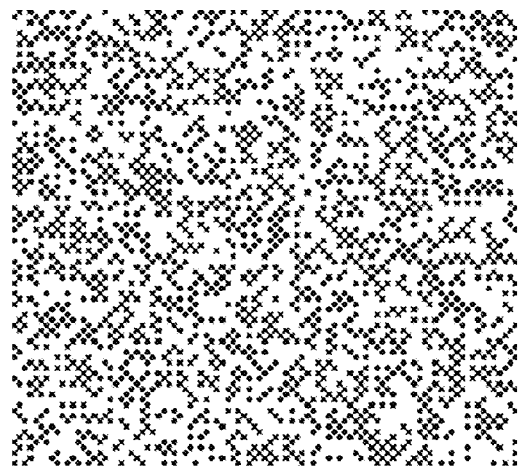
Figure 4A:
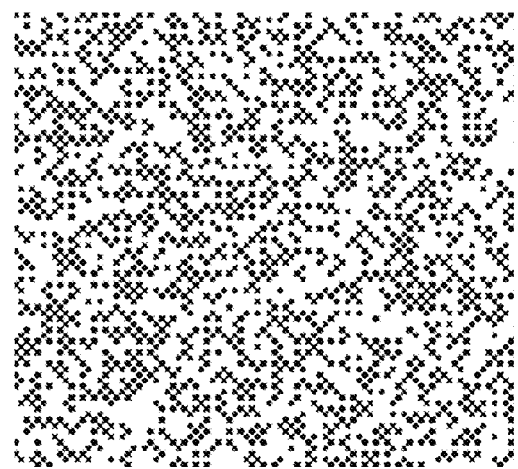

FIG. 4A shows a pattern of nozzle firing opportunities of just left nozzles due to multiple scans of the printhead 104 across a print medium and multiple advances of a print medium. Note that FIG. 4A represents multiple swaths that have been printed onto the print medium by the printhead 104.

FIG. 4B shows a pattern of nozzle firing opportunities of just right nozzles. FIG. 4C shows the combination of the firing patterns of the left and right nozzles due to multiple scans of the printhead 104 across a print medium and multiple advances of the print medium.

As seen in FIG. 4C, the combination of the nozzle firing opportunities of the left and right nozzles shown in FIGS. 4A and 4B produces a target checkerboard pattern that corresponds to the checkerboard pattern of the print mask pattern 302 depicted in FIG. 3. Thus, even though the pattern of nozzle firing opportunities of the left nozzles is irregular as seen in FIG. 4A, and the pattern of nozzle firing opportunities of the right nozzles is irregular as shown in FIG. 4B, the combination of the patterns of nozzle firing opportunities of the left nozzles and the right nozzles produces a regular pattern of firings that is consistent with a target pattern in some examples, such as the target checkerboard pattern of FIG. 4C. Thus, even though the irregular firing patterns of the left and right nozzles can introduce a grain pattern into the image to be printed, the final image that is printed based on the combination of the firings of the left and right nozzles is still according to a received target image to be printed, such that the quality of the printed image is not degraded (except for the introduced graininess) using grain pattern introduction techniques according to some implementations.

In some examples, the controller 102 of the printing system 100 of FIG. 1 can selectively apply an uneven advance step of the print medium 108 between passes, or an even advance step of the print medium 108 between passes, depending upon a received indication. If the received indication specifies that a grain pattern is to be introduced into a printed image, then the controller 102 applies an uneven advance step. On the other hand, if the received indication specifies that a grain pattern is not to be introduced into a printed image, then the controller 102 applies an even advance step. The controller 102 can decide, based on the received indication, whether or not to introduce a grain pattern into an image printed on the print medium. In some examples, the printing system 100 can have multiple modes of operation, where a first mode indicates that a grain pattern is to be introduced into a printed image, while a second mode indicates that no grain pattern is to be introduced. In some examples, a user interface can be presented, such as by the printing system 100 or another computing device, where the user interface can include control items selectable by a user to select between the different modes of operation. The received indication can be based on the mode selected by the user. In other examples, a different entity, such as a program or a machine, can select the mode to use.

FIG. 5 shows an example where the print medium 108 is advanced by an even advance step for successive passes (first pass, second pass, and third pass shown in FIG. 5). For the print mask pattern 302, an even advance step refers to an advance step that advances the print medium 108 by an even number of rows (e.g., 2 rows, 4 rows, etc.). More generally, an even advance step of a print medium refers to an advance step that results in nozzles from same column of nozzles of the printhead 104 being used (based on respective print masks) to deliver dots to a given row of the swath 120 in successive passes of the multiple passes.

For example, for a given row 502 as shown in FIG. 5, in the first pass, the print mask pattern 302 specifies nozzle firing opportunities using just the right nozzles and not the left nozzles to print to the given row 502. In the second pass that immediately follows the first pass, the even advance step of the print medium causes the print mask pattern 302 to define nozzle firing opportunities for just the right nozzles, and not the left nozzles, to print to the given row 502. Then, in the third pass immediately following the second pass, the print mask pattern 302 specifies nozzle firing opportunities for just the right nozzles, and not the left nozzles, to print to the given row 306.

Since the same column of nozzles are used to print each row of a swath in successive passes when the even advance step is used, a more regular pattern of firings of nozzles can be achieved, such as the grain pattern provided by the irregular pattern of firings of nozzles discussed above is not introduced into the printed image.

Figure 6A:
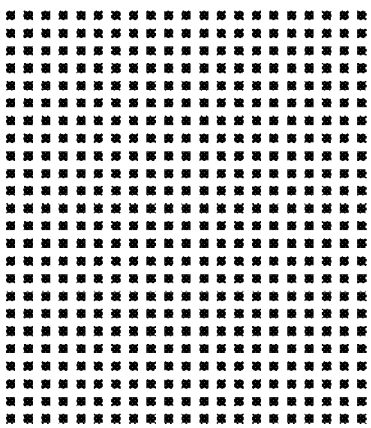
FIGS. 6A-6C illustrate a regular pattern of firing of nozzles of a printhead using the even advance step of a print medium between passes, according to some examples.

FIG. 6A shows a pattern of nozzle firing opportunities of just left nozzles due to multiple scans of the printhead 104 across a print medium and multiple advances of a print medium.

Figure 6B:
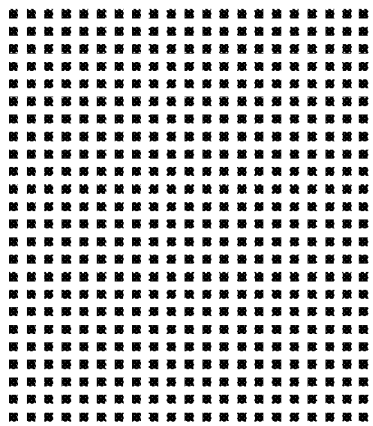

FIG. 6B shows a pattern of nozzle firing opportunities of just right nozzles. The patterns of nozzle firing opportunities of the left and right nozzles shown in FIGS. 6A and 6B are checkerboard patterns consistent with the checkerboard pattern of the print mask pattern 302. The use of the even advance step thus causes a regular pattern of firing of the plural columns of nozzles of the printhead 104 in successive passes of the multiple passes.

Figure 6C:
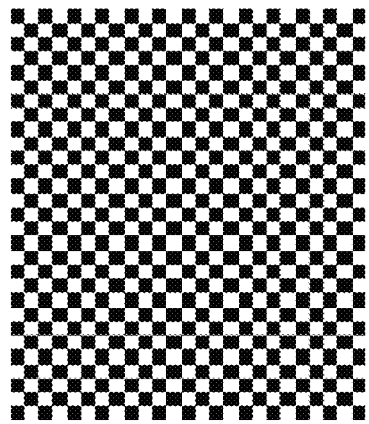

FIG. 6C shows the combination of the firing patterns of the left and right nozzles due to multiple scans of the printhead 104 across a print medium and multiple advances of the print medium. The combination of the nozzle firing opportunities of the left and right nozzles shown in FIGS. 6A and 6B produces a target checkerboard pattern that corresponds to the checkerboard pattern of the print mask pattern 302.

Figure 7:
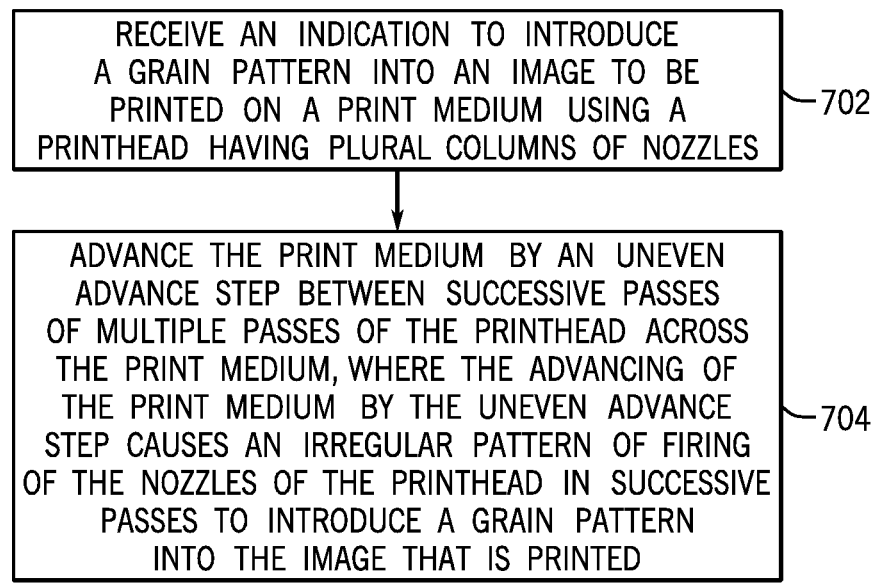
FIG. 7 is a flow diagram of a printing process according to some examples.

FIG. 7 is a flow diagram of an example process of the controller 102 of FIG. 1. The process of FIG. 7 includes receiving (at 702) an indication to introduce a grain pattern into an image to be printed on a print medium using a printhead having plural columns of nozzles, wherein nozzles in a first column of the columns are offset from nozzles in a second column of the columns. The received indication can be dynamically specified by a user, such as in a user interface. In other examples, the indication can be received from a program or a machine.

In response to the indication, the process of FIG. 7 advances (at 704) the print medium by an uneven advance step between successive passes of multiple passes of the printhead across the print medium, where the advancing of the print medium by the uneven advance step causes an irregular pattern of firing of the nozzles of the printhead in successive passes of the multiple passes to introduce a grain pattern into the image that is printed on the print medium, and where the firing of the nozzles of the printhead being controlled by a print mask pattern.

Figure 8:
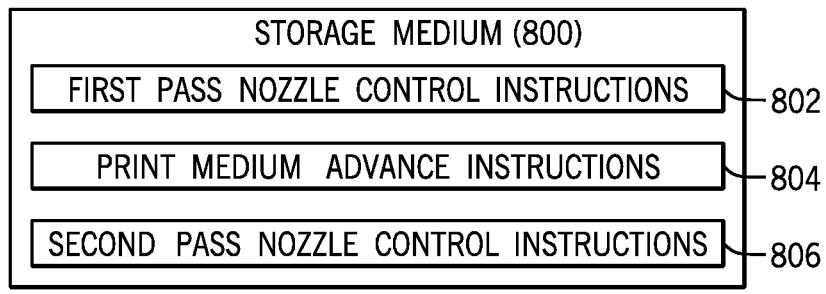
FIG. 8 is a block diagram of a storage medium storing machine-readable instructions according to some examples.

FIG. 8 is a block diagram of a non-transitory machine-readable or computer-readable storage medium 800 storing machine-readable instructions that upon execution can cause a controller of a printing system to use a print mask pattern to introduce a grain pattern into a printed image. The machine-readable instructions include first pass nozzle control instructions 802 to, in a first pass of multiple passes of a printhead over a print medium, control firing of plural columns of nozzles of a printhead of the printing system according to a print mask pattern, wherein nozzles in a first column of the columns are offset from nozzles in a second column of the columns, and where in the first pass the first column of nozzles but not the second column of nozzles is used to print to a given row on the print medium.

The machine-readable instructions further include print medium advance instructions 804 to, for a second pass of the multiple passes, cause the print medium to advance by an advance step. The machine-readable instructions further include second pass nozzle control instructions 806 to, in the second pass, control firing of the plural columns of nozzles of the printhead according to the print mask pattern, where in the second pass the second column of nozzles but not the first column of nozzles is used to print to the given row on the print medium.

The storage medium 800 can include one or multiple different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A printing system comprising:
a printhead comprising a nozzle array comprising plural columns of nozzles to deliver printing fluid to a print medium, wherein nozzles in a first column of the columns are offset from nozzles in a second column of the columns; and
a controller to cause introduction of a grain pattern into an image printed using the printhead onto the print medium by:
for each respective pass of a plurality of passes of the printhead over the print medium, controlling an advance of the print medium by an uneven advance step for a print mask pattern that controls firing of the nozzles of the printhead, where the advance of the print medium by the uneven advance step causes an irregular pattern of firing of the nozzles of the printhead in successive passes of the plurality of passes.

2. The printing system of claim 1, wherein the print mask pattern specifies first positions at which no nozzle of the printhead is fired, and second positions corresponding to firing opportunities for nozzles of the printhead.

3. The printing system of claim 2, wherein a first subset of the second positions specifies firing opportunities for nozzles of the first column, and a second subset of the second positions specifies firing opportunities for nozzles of the second column.

4. The printing system of claim 2, wherein the print mask pattern comprises a checkerboard pattern of the first and second positions.

5. The printing system of claim 2, wherein the controller is to use a respective print mask that is according to the print mask pattern when printing in each respective pass of the plurality of passes, and wherein each of the second positions of the respective print mask has an indicator settable to a first value to cause a respective nozzle of the printhead to fire, and a second value to cause the respective nozzle to remain inactive.

6. The printing system of claim 1, wherein a nozzle in the first column of the printhead is offset from a nozzle in the second column of the printhead by generally a nozzle width.

7. The printing system of claim 1, wherein the print mask pattern has a plurality of rows, wherein successive rows of the plurality of rows specify firing opportunities for nozzles in respective different columns of nozzles.

8. The printing system of claim 7, wherein the controlling of the advancing of the print medium comprises:
after a first pass of the plurality of passes in which printing fluid is deposited by the first column of nozzles but not the second column of nozzles onto a row on the print medium according to the print mask pattern, causing the print medium to advance by the uneven advance step for a second pass of the plurality of passes,
wherein the controller is to, in the second pass, cause the second column of nozzles but not the first column of nozzles to deposit printing fluid onto the row on the print medium.

9. The printing system of claim 1, wherein the printhead is scannable along a first direction across the print medium during each pass of the plurality of passes, and the controller is to cause the print medium to advance in a second, different direction between successive passes of the plurality of passes.

10. A non-transitory machine-readable storage medium storing instructions to control printing using a print mask pattern to introduce a grain pattern into a printed image, the instructions upon execution causing a controller of a printing system:
in a first pass of a plurality of passes of a printhead over a print medium, control firing of plural columns of nozzles of a printhead of the printing system according to the print mask pattern, wherein nozzles in a first column of the columns are offset from nozzles in a second column of the columns, wherein in the first pass the first column of nozzles but not the second column of nozzles is used to print to a given row on the print medium;
for a second pass of the plurality of passes, cause the print medium to advance by an advance step; and
in the second pass, control firing of the plural columns of nozzles of the printhead according to the print mask pattern, wherein in the second pass the second column of nozzles but not the first column of nozzles is used to print to the given row on the print medium.

11. The non-transitory machine-readable storage medium of claim 10, wherein the instructions upon execution cause the controller to:
for each respective pass of the plurality of passes of the printhead over the print medium, control an advance of the print medium by an uneven advance step for the print mask pattern that causes an irregular pattern of firing of the nozzles of the printhead in successive passes of the plurality of passes.

12. The non-transitory machine-readable storage medium of claim 11, wherein the instructions upon execution cause the controller to:
receive an indication of selection of a mode of operation of the printing system indicating that the grain pattern is to be introduced; and
in response to receiving the indication of selection of the mode of operation, set the print medium to advance by the uneven advance step for each respective pass of the plurality of passes.

13. The non-transitory machine-readable storage medium of claim 11, wherein the instructions upon execution cause the controller to:
receive an indication of selection of a mode of operation of the printing system indicating that the grain pattern is not to be introduced; and
in response to the indication of the selection of the mode of operation, set the print medium to advance by an even advance step for each respective pass of the plurality of passes, wherein the advance of the print medium by the even advance step causes a regular pattern of firing of the plural columns of nozzles of the printhead in successive passes of the plurality of passes such that a given row on the print medium is printed with a same column of nozzles in each of the plurality of passes.

14. A method of a printing system comprising steps of:
receiving an indication to introduce a grain pattern into an image to be printed on a print medium using a printhead comprising plural columns of nozzles, wherein nozzles in a first column of the columns are offset from nozzles in a second column of the columns; and
in response to the indication, advancing the print medium by an uneven advance step between successive passes of a plurality of passes of the printhead across the print medium, the advancing of the print medium by the uneven advance step causing an irregular pattern of firing of the nozzles of the printhead in successive passes of the plurality of passes to introduce the grain pattern into the image that is printed on the print medium, the firing of the nozzles of the printhead being controlled by a print mask pattern.

15. The method of claim 14, wherein the print mask pattern specifies first positions at which no nozzle of the printhead is fired, and second positions corresponding to firing opportunities for nozzles of the printhead.

* * * * *